United States Patent
Heo et al.

(10) Patent No.: US 12,121,845 B2
(45) Date of Patent: Oct. 22, 2024

(54) KIT FOR CONCENTRATING LOW-CONCENTRATION AIR POLLUTANTS

(71) Applicant: KOREA RESEARCH INSTITUTE OF CHEMICAL TECHNOLOGY, Daejeon (KR)

(72) Inventors: Iljeong Heo, Daejeon (KR); Jin Hee Lee, Daejeon (KR); Young Woo You, Daejeon (KR); Yun Ho Jeong, Daejeon (KR); Sang Joon Kim, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 407 days.

(21) Appl. No.: 17/630,306

(22) PCT Filed: Jul. 24, 2020

(86) PCT No.: PCT/KR2020/009798
§ 371 (c)(1),
(2) Date: Jan. 26, 2022

(87) PCT Pub. No.: WO2021/020819
PCT Pub. Date: Feb. 4, 2021

(65) Prior Publication Data
US 2022/0266192 A1    Aug. 25, 2022

(30) Foreign Application Priority Data
Jul. 26, 2019  (KR) .................. 10-2019-0091141

(51) Int. Cl.
*B01D 53/04* (2006.01)
*B01D 45/06* (2006.01)
*G01N 1/22* (2006.01)

(52) U.S. Cl.
CPC ......... *B01D 53/0407* (2013.01); *B01D 45/06* (2013.01); *G01N 1/22* (2013.01)

(58) Field of Classification Search
CPC .... B01D 53/0407; B01D 53/04; B01D 45/06; B01D 46/10; B01D 2257/708;
(Continued)

(56) References Cited

U.S. PATENT DOCUMENTS 7,229,711 B2 * 6/2007 Breault ............. H01M 8/04225
                                                        429/442
2012/0270334 A1 * 10/2012 Ojeda ...................... G01N 1/40
                                                        436/178
2024/0077390 A1 * 3/2024 Kim ................... G01N 33/0011

FOREIGN PATENT DOCUMENTS

JP      H08-101175 A     4/1996
JP      2006-247595 A    9/2006
(Continued)

OTHER PUBLICATIONS

Machine-generated English translation of JP 2015-197400 A, published Nov. 9, 2015.*

(Continued)

*Primary Examiner* — Frank M Lawrence, Jr.
(74) *Attorney, Agent, or Firm* — Hauptman Ham, LLP

(57) ABSTRACT

The present invention relates to a kit for concentrating low-concentration air pollutants, and to a concentration kit for concentrating low-concentration air pollutants, and then desorbing same so as to detect the components and concentrations of the pollutants. The present invention comprises: a sensor positioned on a channel in which gas moves, so as to detect pollutants in the gas; and a concentration part, which comprises an adsorbent for adsorbing and desorbing the pollutants in the gas moving to the sensor, so as to transfer concentrated pollutants to the sensor.

18 Claims, 11 Drawing Sheets

(58) Field of Classification Search
CPC ...... B01D 2258/06; B01D 2259/40096; B01D 53/30; B01D 53/0454; B01D 53/02; G01N 1/22; G01N 1/2273; G01N 2001/245; G01N 1/24; G01N 1/405; G01N 1/40; G08C 17/02
USPC ...... 96/108, 121, 132, 146, 413; 95/90, 143, 95/148; 73/23.2, 31.01, 31.02, 863
See application file for complete search history.

(56) References Cited

FOREIGN PATENT DOCUMENTS

| | | |
|---|---|---|
| JP | 2015-197400 A | 11/2015 |
| KR | 10-1789233 B1 | 11/2017 |
| KR | 10-1843544 B1 | 3/2018 |
| KR | 10-1907622 B1 | 10/2018 |

OTHER PUBLICATIONS

International Search Report dated Dec. 4, 2020 for corresponding International Patent Application No. PCT/KR2020/009798.
Written Opinion dated Dec. 4, 2020 for corresponding International Patent Application No. PCT/KR2020/009798.

\* cited by examiner

KIT FOR CONCENTRATING LOW-CONCENTRATION AIR POLLUTANTS

CROSS-REFERENCE TO RELATED APPLICATION

The present application is a national stage filing under 35 U.S.C § 371 of PCT application number PCT/KR2020/009798 filed on Jul. 24, 2020 which is based upon and claims the benefit of priorities to Korean Patent Application No. 10-2019-0091141 filed on Jul. 26, 2019 in the Korean Intellectual Property Office. All of the aforementioned applications are hereby incorporated by reference in their entireties.

TECHNICAL FIELD

The present invention relates to a kit for concentrating low-concentration air pollutants, and more particularly, to a concentration kit capable of detecting components and concentrations of pollutants by concentrating and then desorbing low-concentration air pollutants.

BACKGROUND ART

Air pollutants that are artificially or naturally generated from substances in the atmosphere are trace substances that adversely affect living things or substances, and may be divided into gaseous pollutants and dust. The former includes sulfur dioxide and carbon monoxide, and the latter includes trace heavy metals, silicic acid, and organic materials. There are over 200 types of air pollutants that may be measured with current measurement technology, and if a measurement method of trace substances is advanced in the future, the types thereof will further increase. Since the dust also includes adsorption of gas, many of which have the form of complex pollutants, and the pollutants sometimes react with each other in the atmosphere to create new pollutants.

In order to treat air pollutants, it is necessary to detect air pollutants in the air, and in this case, most conventional detection sensors may detect up to a ppm unit, and expensive sensors are required to detect up to a ppb or ppt unit. The conventional detection sensor has a problem in that it may not detect trace air pollutants when there are trace air pollutants in the air because it may detect only up to the ppm unit.

In the related document Korean Patent Publication No. 10-1907622 ("Concentrate catalytic combustion system with active concentration rate control means" registered on Oct. 5, 2018), there is disclosed a method for reducing a combustible temperature by concentrating an organic compound when burning and treating the organic compound, and this is to increase concentration by concentrating the organic compound.

However, the above-mentioned related document is for concentrating the organic compound to adjust the organic compound to a suitable concentration for combustion, and does not disclose any technical features for detecting the components of the organic compound. Only when the component of the organic compound is detected, it is possible to track where the organic compound has formed, and to find a solution to reduce the formation of the organic compound.

Therefore, the present invention suggests a concentration kit that may detect the component of the organic compound by concentrating the organic compound for a certain period of time regardless of the concentration of the organic compound present in the air and forming the organic compound to be a concentration that may be captured by the conventional detection sensor.

DISCLOSURE

Technical Problem

An object of the present invention is to provide a concentration kit in which a blowing fan, an adsorption portion, and a sensor are provided inside an enclosure in which a predetermined space is formed, air pollutants are adsorbed to the adsorption portion and concentrated, and then desorbed after a certain period of time, and the sensor may detect component and concentration of the air pollutants.

Further, an object of the present invention is to provide a concentration kit in which no separate power is consumed to operate the concentration kit because a solar panel is installed on an upper surface of an enclosure, and a flow direction of a gas is not disturbed because an outside air suction portion for adsorption and an outside air suction portion for desorption are separately formed.

Technical Solution

In one general aspect, a kit for concentrating low-concentration air pollutants includes: a sensor that is positioned in a flow path through which gas moves and detects pollutants in the gas; and a concentration portion that includes an adsorbent that the pollutants in the gas moving to the sensor are adsorbed and desorbed and transfers concentrated pollutants to the sensor.

The kit may further include an enclosure in which an internal space is formed; inlets formed at an upper end portion and a lower end portion of the enclosure so that the gas is introduced into the enclosure; outlets formed at an upper end portion and a lower end portion of the enclosure so that the gas inside the enclosure is discharged to the outside; the concentration portion installed inside the enclosure to adsorb the pollutants of the gas thereto; a fan installed under the concentration portion to adsorb or desorb the pollutants of the gas to or from the concentration portion according to a rotational direction; and the sensor installed over the concentration portion to measure a concentration of the concentrated pollutant and detect a type of the concentrated pollutant from the concentration portion, wherein the concentration portion is installed to partition the internal space of the enclosure, and an upper portion and a lower portion of the concentration portion are divided into a first zone and a second zone.

The inlets may include a first inlet formed at the upper end portion of the enclosure to allow the gas to be introduced into the first zone, and a second inlet formed at the lower portion of the enclosure to allow a carrier gas for desorbing the pollutants adsorbed to the concentration portion to be introduced into the second zone.

The outlets may include a first outlet formed at the lower end portion of the enclosure to allow the gas that passes through the concentration portion and is located in the second zone to be discharged to the outside, and a second outlet formed at the upper end portion of the enclosure to allow the carrier gas located in the first zone and the concentrated gas including the pollutants desorbed from the concentration portion to be discharged to the outside.

The fan may have a rotational direction for adsorbing the pollutants to the concentration portion and a rotational direction for desorbing the pollutants from the concentration portion which are opposite to each other.

The kit may further include a control unit that controls opening and closing of the first inlet, the second inlet, the first outlet, and the second outlet, and the rotational direction of the fan.

The kit may further include a solar panel installed on an outer surface of the enclosure; and a battery that stores energy generated from the solar panel.

The kit may further include a filter formed at a lower end of the concentration portion to prevent the pollutants from passing therethrough.

The concentration portion may include a plurality of adsorbents, at least two or more adsorbents may be formed of different materials to adsorb different pollutants, and the concentration portion may include a desorption means positioned to be adjacent to each of the adsorbents to individually desorb the pollutants from the adsorbents.

The desorption means may be a heating body for heating the adsorbents to desorb the pollutants from the adsorbents.

The concentration portion may include the adsorbents arranged to be spaced apart from each other at equal intervals along a movement direction of the gas.

The kit may further include a main member forming a main flow path through which the gas introduced from the outside moves to the sensor; the concentration portion positioned on the main flow path; and a sub member positioned between the concentration portion and the sensor and forming a sub flow path branched from the main flow path.

A plurality of concentration portions may be provided, and the concentration portions may be connected in parallel to the main flow path.

In another general aspect, a concentrating method using a kit for concentrating low-concentration air pollutants includes a first unit process including: a first introduction step of introducing a gas containing pollutants into an upper end portion of an enclosure through an inlet formed at the upper end portion of the enclosure by rotating a fan installed at a lower end portion of the enclosure; an adsorption step of adsorbing the pollutants contained in the gas introduced in the first introduction step to a concentration portion; and a first discharging step of discharging the gas passing through the concentration portion through an outlet formed at a lower end portion of the enclosure, and a second unit process including: a second introduction step of introducing a carrier gas into the enclosure through an inlet formed at the lower end portion of the enclosure by rotating the fan in a direction opposite to that in the first introduction step; a desorption step of desorbing the pollutants adsorbed to the concentration portion by the carrier gas introduced in the second introduction step; a second discharging step of discharging a concentrated gas including the pollutants and the carrier gas through an outlet formed at the upper end portion of the enclosure; and a measuring step of measuring, by a sensor, the type and concentration of pollutants contained in the concentrated gas discharged in the second discharging step, wherein the second unit process is performed after the first unit process is performed for a predetermined time.

The concentrating method may further include a first determination step of determining whether or not the time for performing the first unit process is a preset value or more, wherein when it is determined in the first determination step that a time value for which the first unit process is performed is the preset value or more, the inlet formed at the upper portion of the enclosure and the outlet formed at the lower portion of the enclosure are closed and the second unit process is performed, and when it is determined in the first determination step that the time value for which the first unit process is performed is less than the preset value, the first unit process is further performed.

In still another general aspect, a method of detecting low-concentration air pollutants includes continuously performing a first unit process for a predetermined time, the first unit process including: a first introduction step of introducing a gas containing pollutants into an upper end portion of an enclosure through an inlet formed at the upper end portion of the enclosure by rotating a fan installed at a lower end portion of the enclosure; an adsorption step of adsorbing the pollutants contained in the gas introduced in the first introduction step to a concentration portion; and a first discharging step of discharging the gas passing through the concentration portion through an outlet formed at a lower end portion of the enclosure, and performing a second unit process including: a second introduction step of introducing a carrier gas into the enclosure through an inlet formed at the lower end portion of the enclosure by rotating the fan in a direction opposite to that in the first introduction step; a desorption step of desorbing the pollutants adsorbed to the concentration portion by the carrier gas introduced in the second introduction step; a second discharging step of discharging a concentrated gas including the pollutants and the carrier gas through an outlet formed at the upper end portion of the enclosure; and a measuring step of measuring, by a sensor, the type and concentration of pollutants contained in the concentrated gas discharged in the second discharging step.

The concentrating method may further include, after the performing of the second unit process, a data transmission step of transmitting data measured by the sensor to a server or a terminal of a user.

After the data transmission step, the first unit process may be performed again.

Advantageous Effects

The kit for concentrating low-concentration air pollutants of the present invention having the configuration as described above has an economic effect because the blowing fan, the adsorption portion, and the sensor are provided inside the enclosure in which the predetermined space is formed, the air pollutants are adsorbed to the adsorption portion and concentrated, and then desorbed after a certain period of time, and the sensor may detect the component and concentration of the air pollutants. Further, since the separate power is not consumed by the solar panel formed on the upper surface of the enclosure, there is an effect of reducing energy use, and since the outside air suction portion for adsorption and the outside air suction portion for desorption are formed separately so that the flow direction of the gas is not disturbed, there is an effect that the organic compound may be easily adsorbed and desorbed.

BEST MODE

Hereinafter, an embodiment of the present invention will be described in detail with reference to the accompanying drawings.

A kit for concentrating low-concentration air pollutants of the present invention includes a sensor that is positioned in a flow path through which gas moves and detects pollutants in the gas, and a concentration portion that includes an adsorbent that the pollutants in the gas moving to the sensor are adsorbed and desorbed and transfers concentrated pollutants to the sensor, and has excellent sensing sensitivity as the concentrated pollutants are transferred to the sensor.

Figure 1:
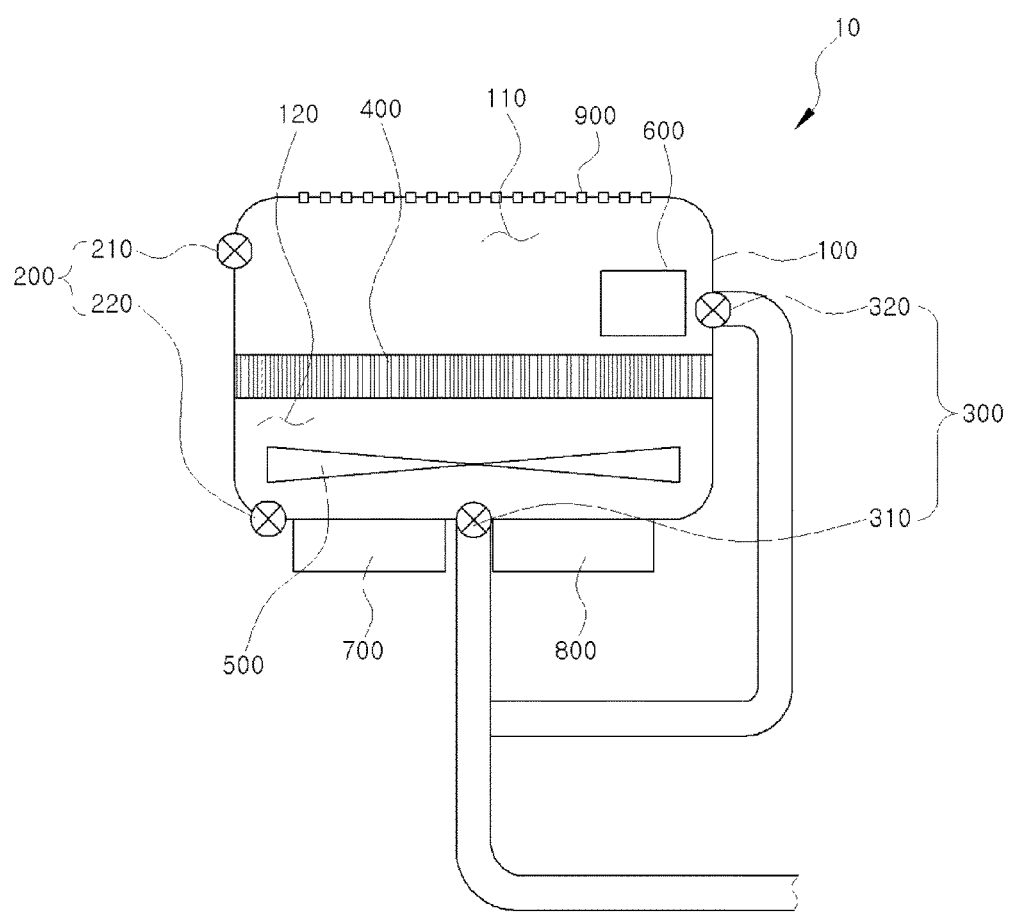
FIG. 1 is a schematic view of a kit for concentrating low-concentration air pollutants according to an embodiment of the present invention.

FIG. 1 illustrates a schematic view of a kit for concentrating low-concentration air pollutants according to an embodiment of the present invention. As illustrated in FIG. 1, an enclosure 100 provided with an internal space is formed, a concentrating portion 400 on which the pollutants are adsorbed is formed inside the enclosure 100 along a longitudinal direction of the enclosure 100 so as to be in contact with an inner surface of the enclosure 100, and a plurality of inlets 200 through which external gas is introduced and a plurality of outlets 300 through which gas inside the enclosure 100 is discharged are formed. In addition, a sensor 600 for measuring the concentration of the pollutant and detecting the type of the pollutant is installed inside the enclosure 100. A fan 500 for introducing and discharging the external gas is formed under the concentration portion 400, and a control unit 700 for controlling an operation of the concentration kit is formed under the enclosure 100. A battery 800 that provides power required to operate the concentration kit of the present invention is installed on one side of the enclosure 100, and stores energy generated from a solar panel 900 installed on an upper surface of the enclosure 100.

The enclosure 100 is divided into an upper space of the concentration portion 400 called a first zone 110 and a lower space thereof called a second zone 120 based on the concentration portion 400, and the inlets 200 and the outlets 300 are also divided into a first inlet 210, a second inlet 220, a first outlet 310, and a second outlet 320 according to the formed positions. In this case, the first inlet 210 and the second outlet 320 formed to communicate with the first zone 110 are installed at an upper end portion of the enclosure 100, and the second inlet 220 and the first outlet 310 formed to communicate with the second zone 120 are installed at a lower end portion of the enclosure 100. As described above, each of the inlets 200 and outlets 300 is formed to be divided, so that a flow path through which the pollutants contained in the external gas are adsorbed to the adsorption portion in the concentration portion 400 and a flow path through which the pollutants adsorbed to the concentration portion 400 are desorbed are separately formed. A flow of the gas will be described with reference to FIGS. 2 and 3.

Figure 2:
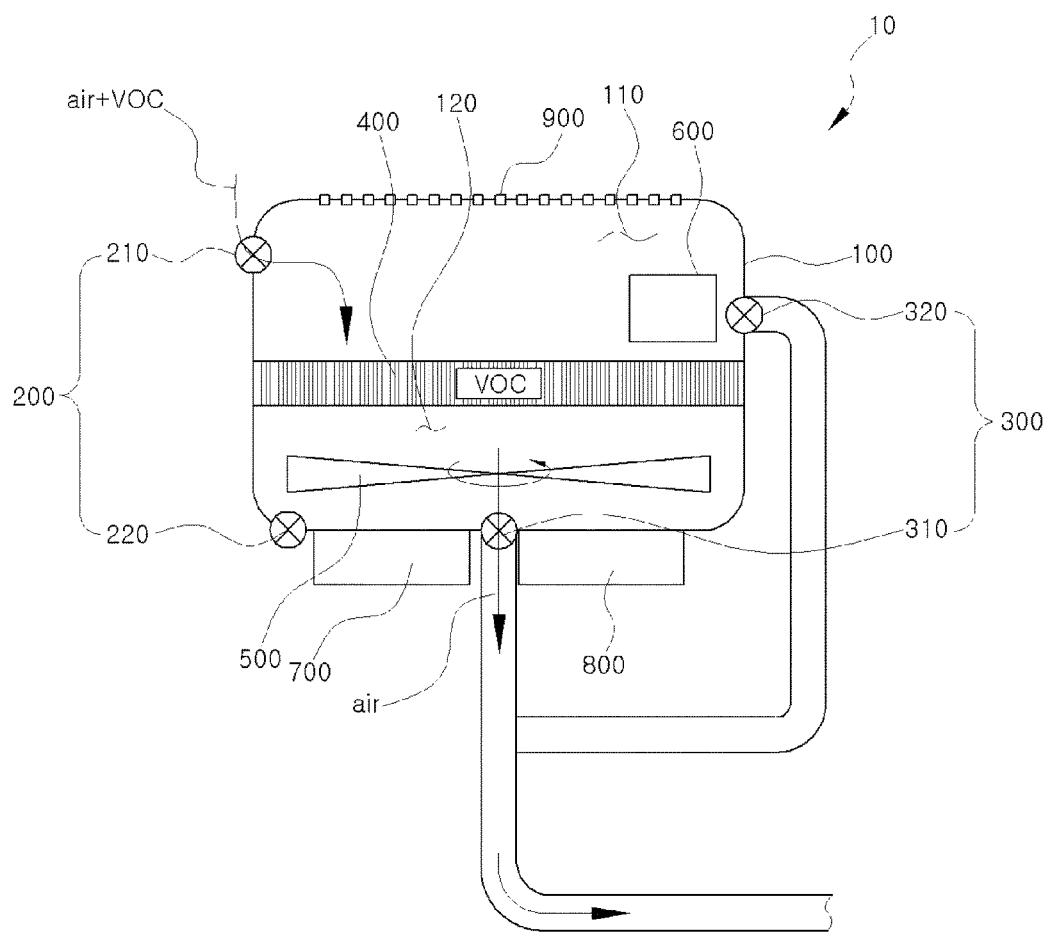
FIG. 2 is a schematic view of a kit for concentrating low-concentration air pollutants according to an embodiment of the present invention.

FIG. 2 illustrates a schematic view of a kit for concentrating low-concentration air pollutants according to an embodiment of the present invention. FIG. 2 illustrates when air pollutants are adsorbed to the concentration portion 400, and as illustrated in FIG. 2, a mixed gas (gas+pollutant) containing pollutants is introduced into the enclosure 100 through the first inlet 210 formed in communication with the first zone 110. In this case, it is preferable that the fan 500 rotates in a clockwise or counterclockwise direction so that the mixed gas is easily introduced into the enclosure 100.

The mixed gas introduced into the enclosure 100 passes through the concentration portion 400, the pollutants contained in the mixed gas passing through the concentration portion 400 are adsorbed to the concentration portion 400, and the gas from which the pollutants are removed is discharged to the outside through the first outlet 310 formed in communication with the second zone 120. As a result, even if the mixed gas contains the pollutants that are not detected by the sensor, the pollutants pass through the concentration portion 400 for a predetermined time and are adsorbed to the concentration portion 400, so that a concentration of the pollutants in the concentration portion 400 is higher than the concentration of the pollutants contained in the mixed gas.

Figure 3:
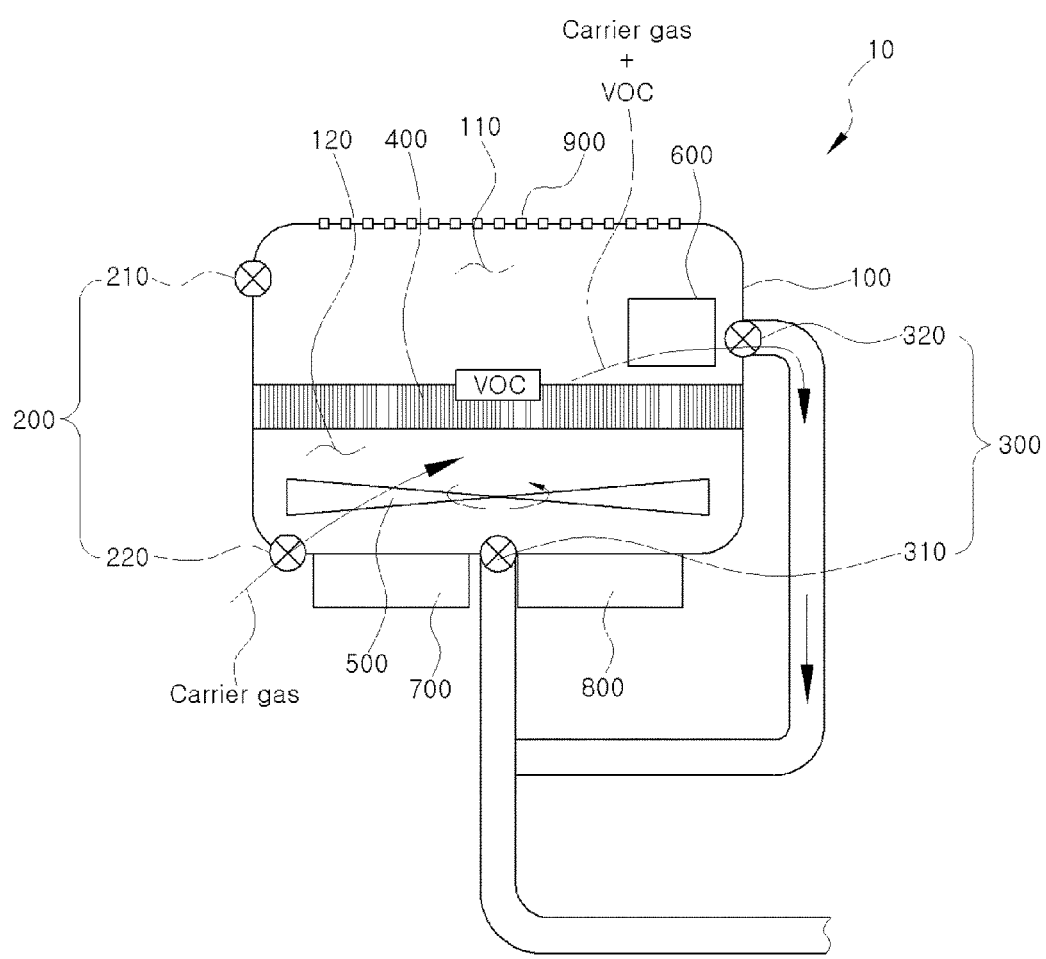
FIG. 3 is a schematic view of a kit for concentrating low-concentration air pollutants according to an embodiment of the present invention.

FIG. 3 illustrates a schematic view of a kit for concentrating low-concentration air pollutants according to an embodiment of the present invention. FIG. 3 illustrates when pollutants are adsorbed to the concentration portion 400, and as illustrated in FIG. 3, a carrier gas (external air) for desorbing the pollutants adsorbed to the concentration portion 400 from the concentration portion 400 through the second inlet 220 formed in communication with the second zone 120 is introduced into the enclosure 100. In this case, it is preferable that the fan 500 rotates in a clockwise or counterclockwise direction so that the carrier gas may be easily introduced into the enclosure 100, but it is preferable to rotate in an opposite direction to that when adsorbed to the concentration portion 400. The carrier gas introduced into the enclosure 100 passes through the concentration portion 400, and desorbs the pollutants adsorbed to the concentration portion 400 from the concentration portion 400 while passing through the concentration portion 400.

The concentration portion 400 to which the pollutants are adsorbed may include an adsorbent made of a material capable of adsorbing various volatile pollutants. The adsorbent may be a fibrous or inorganic filter, and a porous filter having a high specific surface area and small pore size may be preferable. Specifically, the porous filter may have a specific surface area of 800 m$^2$/g or more and may have an average pore size of 50 nm or less, and may have, without limitation, a specific surface area of 2000 m2/g or less, and an average pore size of 2 nm or more.

The concentrated gas (pollutants desorbed from the concentration portion 400+carrier gas) in which the pollutants desorbed from the concentration portion 400 and the carrier gas are mixed may be discharged through the second outlet 320, and may be discharged to the outside after going through a separate purification process. In this case, since a sensor 600 for measuring the concentration of pollutants in the concentrated gas and detecting the type of pollutants is installed in the vicinity of the second outlet 320, the concentrated gas is detected by the sensor 600 when the concentrated gas moves to the second outlet 320. Since the pollutants adsorbed to the concentration portion 400 have a relatively high concentration compared to the mixed gas, the sensor 600 may sufficiently detect such pollutants.

In this case, since the fan 500 is installed in the second zone 120, the carrier gas introduced through the second inlet 220 has an increased flow rate and increased pressure due to the power of the fan 500 rotating, thereby making it possible to more easily desorb the pollutants adsorbed to the concentration portion 400.

The desorbed pollutants may be detected through the sensor 600, and the sensor 600 may be a known chemical sensor capable of detecting various pollutants. For example, a semiconductor gas sensor using an oxide semiconductor material, an ionization gas sensor that detects a volatile organic compound (VOC) by ionizing the VOC by colliding with electrons, or a catalytic combustion method gas sensor using a catalyst such as palladium or platinum, or an alumina carrier may be exemplified. As a specific example, the semiconductor gas sensor may be a sensor using a metal oxide such as $SnO2$, $TiO_2$, $ZrO$, and $In_2O_3$, and may measure the concentration and type of gas by using a surface reaction of a sensing material generated by adsorption and desorption of surrounding gas, but is not limited thereto.

Figure 4:
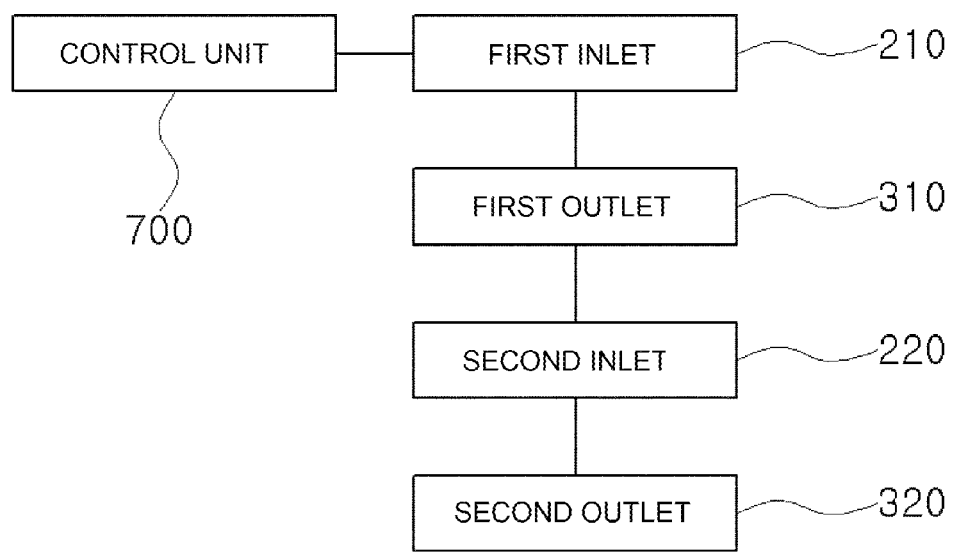
FIG. 4 is a block diagram of the kit for concentrating low-concentration air pollutants according to an embodiment of the present invention.

FIG. 4 illustrates a block diagram of the kit for concentrating low-concentration air pollutants according to an embodiment of the present invention. As illustrated in FIG. 4, the kit for concentrating low-concentration air pollutants of the present invention is installed with the control unit 700 that controls the operation of the kit, and the control unit 700 controls opening and closing of the first inlet 210, the second inlet 220, the first outlet 310, and the second outlet 320.

By opening the first inlet 210 and the first outlet 310, and closing the second inlet 220 and the second outlet 320 when adsorbing the pollutants contained in the mixed gas to the concentration portion 400, a flow path in which the mixed gas introduced into the enclosure 100 sequentially passes through the first inlet 210→the first zone 110→the concentration portion 400→the second zone 120→the first outlet 310 is formed. Conversely, by closing the first inlet 210 and the first outlet 310, and opening the second inlet 220 and the second outlet 320 when desorbing the pollutants from the concentration portion 400, a flow path in which the carrier gas introduced into the enclosure 100 sequentially passes through the second inlet 220→the second zone 120→the concentration portion 400→the first zone 110→the second outlet 320 is formed. As a result, it is possible to form the flow paths in which the flows of gas during adsorption and desorption of pollutants do not interfere with each other, respectively, in one kit.

Figure 5:
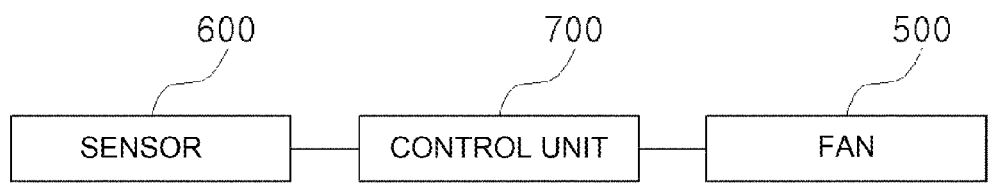
FIG. 5 is a block diagram of the kit for concentrating low-concentration air pollutants according to an embodiment of the present invention.

FIG. 5 illustrates a block diagram of the kit for concentrating low-concentration air pollutants according to an embodiment of the present invention. As illustrated in FIG. 5, the control unit 700 of the kit for concentrating low-concentration air pollutants of the present invention controls not only the opening and closing of the first inlet 210, the second inlet 220, the first outlet 310, and the second outlet 320, but also an operation of the fan 500.

As described above, the control unit 700 may control a rotational direction of the fan 500 to rotate in the opposite direction when adsorbing and desorbing the pollutants, and may also control a rotation speed of the fan 500 in order to control an inflow amount of the carrier gas according to the concentration value of the pollutant measured by the sensor 600.

According to an aspect of the present invention, a concentration portion 450 of the present invention may include a plurality of adsorbents 460, at least two or more adsorbents 460 made of different materials being adsorbed with different pollutants, respectively, and a desorption means 470 that is positioned adjacent to each of the adsorbents 460 to individually desorb the pollutants from the adsorbent 460. Specifically, when only one type of pollutant (hereinafter referred to as a first pollutant) is intended to be sensed, only the first pollutant may be transferred to the sensor 650 for sensing by operating the adsorbent 460 made of a material capable of adsorbing the first pollutant and the desorption means 470 adjacent thereto. Furthermore, when sensing two or more types of pollutants, the two types of pollutants may be transferred to the sensor 650 for sensing by operating the two adsorbents 460 to which the two types of pollutants are respectively adsorbed and the adjacent desorption means 470. The concentration portion 450 of the present invention as described above may selectively transfer the concentrated pollutants to the sensor 650, thereby improving selectivity in sensing the pollutants by the sensor 650.

Figure 6:
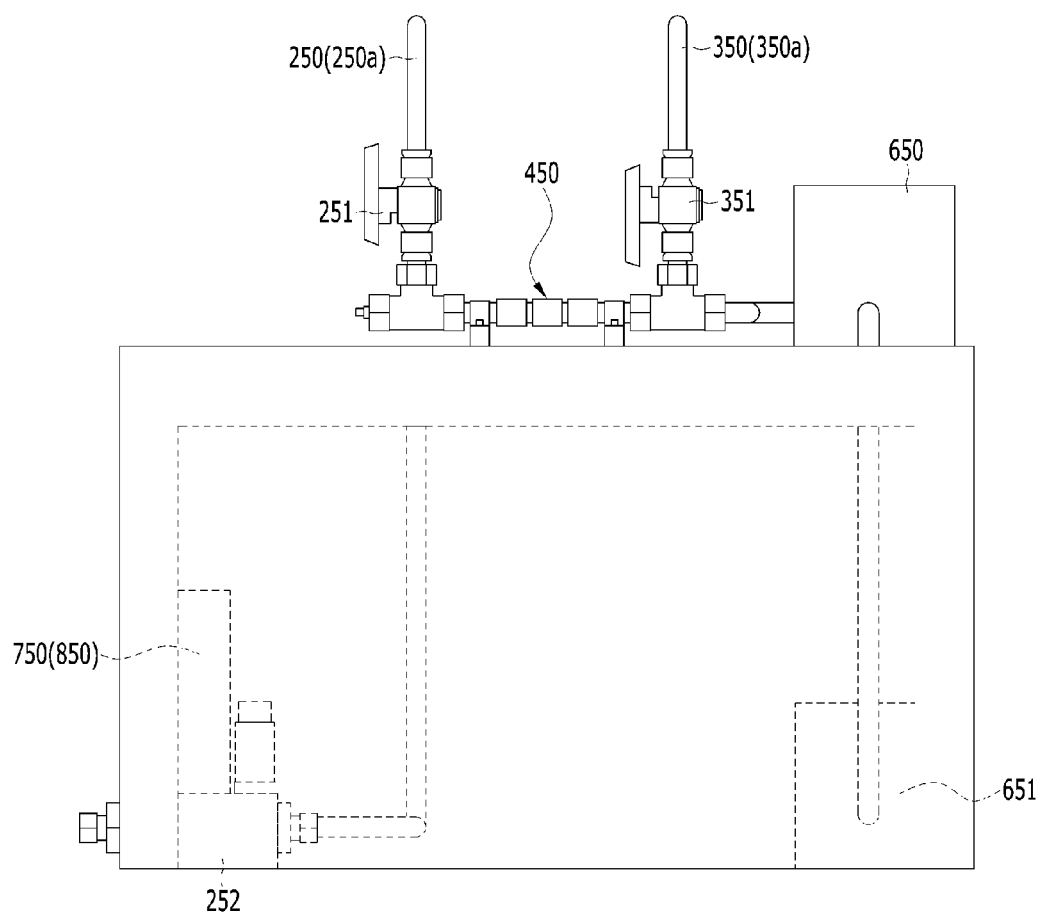
FIG. 6 is a front view of the kit for concentrating low-concentration air pollutants according to an embodiment of the present invention.
Figure 7:
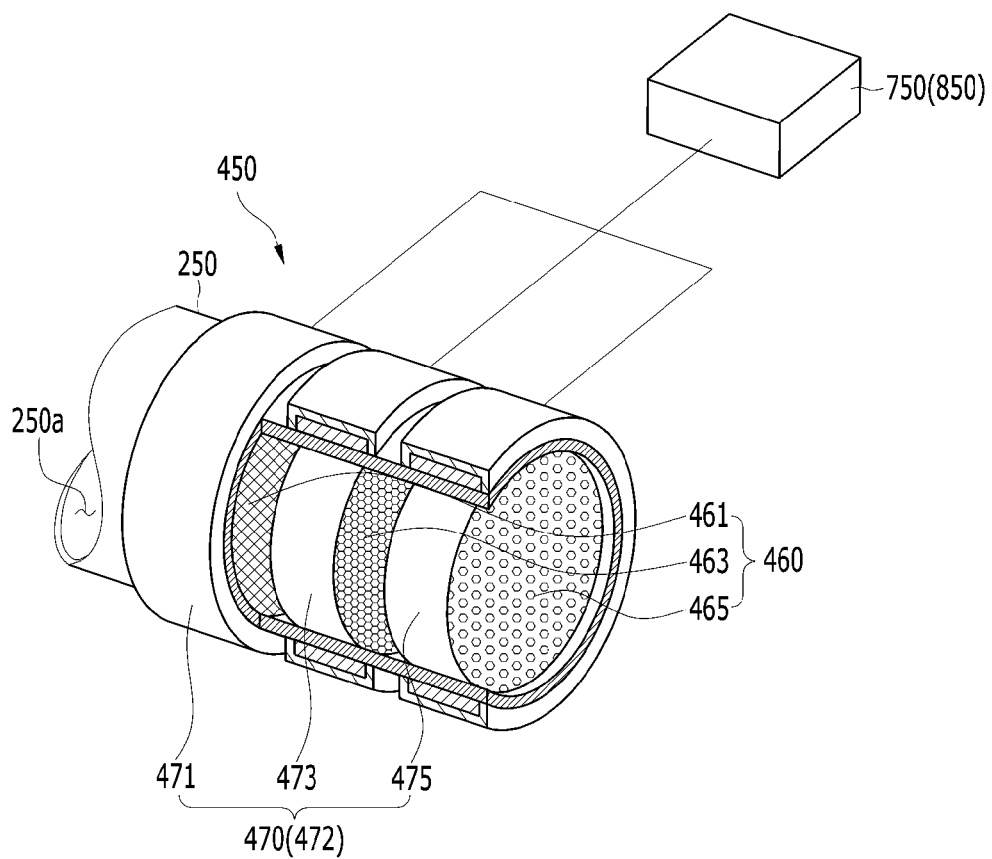
FIG. 7 is a partially cut perspective view illustrating the main portions of the kit for concentrating low-concentration air pollutants illustrated in FIG. 6.

Referring to FIGS. 6 and 7, specifically, the kit for concentrating low-concentration air pollutants including the concentration portion 450 as described above may include a main member 250 forming a main flow path 250a through which the gas introduced from the outside moves to the sensor 650, the concentration portion 450 positioned on the main flow path 250a, and a sub member 350 positioned between the concentration portion 450 and the sensor 650 and forming a sub flow path 350a branched from the main flow path 250a.

In detail, the main member 250 that forms the main flow path 250a, which is a passage through which a gas containing the pollutants moves, may be provided as a pipe member as illustrated in the drawing, but may be a main body in which the internal space is formed, such as the enclosure illustrated in FIG. 1. That is, the main member 250 forms the main flow path 250a, which is a passage through which the gas moves, and a structure in which the concentration portion 450, which will be described later, may be installed is not limited. The main member 250 is opened and closed by a first valve 251 to adjust whether or not the gas is supplied from the outside. In addition, the main member 250 may be connected to a mass flow controller (MFC) 252. The gas introduced through the main member 250 is a gaseous state containing pollutants, for example, may be unpurified atmosphere, but is not limited thereto.

The sensor 650 which is the same as the sensor 650 of FIGS. 1 to 5 described above may be a known chemical sensor capable of detecting various pollutants, and a plurality of sensors 650 may be provided according to the type and number of pollutants, unlike the drawings.

The concentration portion 450 that includes a plurality of adsorbents 460 may be a plurality of adsorbents 460 installed inside the main member 250 in a direction partitioning the main flow path 250a as illustrated in the drawing. The plurality of adsorbents 460 may be arranged in various ways, but may be arranged to be spaced apart from each other at equal intervals along a movement direction of the gas in the main flow path 250a. Accordingly, when the desorption means 470 to be described later are installed to be adjacent to each adsorbent 460, respectively, it may be easy to design a position such that one desorption means 470 affects only one adsorbent 460.

At least two or more adsorbents 460 of the concentration portion 450 may be formed of different materials to adsorb different pollutants. Specifically, it is assumed that the adsorbents 460 arranged along the movement direction of the gas in the main flow path 250a are sequentially the first to third adsorbents 461, 463, and 465, the concentration portion 450 of the present invention may include the first to third adsorbents 461, 463, and 465 all formed of different materials, and unlike this, may include the first and third adsorbents 461 and 465 formed of the same material, and the second adsorbent 463 formed of a material different from that of the first and third adsorbents 461 and 465. In the concentration portion 450 as described above, the same type of pollutants may be adsorbed to the adsorbent 460 formed of the same material, and different types of pollutants may be adsorbed to the adsorbent 460 formed of different materials.

As an example, the first adsorbent 461 may be formed of a hydrophilic material capable of advantageously adsorbing moisture, and the second adsorbent 463 may be formed of a hydrophobic material capable of advantageously adsorbing an organic solvent. Specifically, the first adsorbent 461 may contain any one or two or more materials selected from the group consisting of activated clay, silica gel, activated alumina, and synthetic zeolite, and the second adsorbent 463 may contain any one or two or more materials selected from the group consisting of charcoal, bone charcoal, and activated carbon. The adsorbent 460 of the present invention is not limited thereto, and conventional adsorbents 460 capable of adsorbing pollutants contained in gas are all applicable, but, at least two or more of the plurality of adsorbents 460 are provided with different materials so that different pollutants may be adsorbed.

The desorption means 470 is positioned to be adjacent to each of the plurality of adsorbents 460 to individually desorb the pollutants from the adsorbents 460, and conventional desorption means 470 capable of desorbing the adsorbed material from the adsorbents 460 are all applicable. For example, the desorption means 470 may be an air supply capable of desorbing the pollutants adsorbed to the adsorbent 460 by supplying a carrier gas, and a vibrating body capable of desorbing the pollutants by vibrating the adsorbent 460. Preferably, the desorption means 470 may be a heating body 472 that heats each of the adsorbents 460 to desorb the pollutants from the adsorbents 460. Since the heating body 472 desorbs the pollutants from the adsorbents 460 through heat supply, a desorption rate of the pollutants is high. Accordingly, the kit for concentrating low-concentration air pollutants of the present invention may more quickly perform sensing.

As the heating body 472, all of the conventional heating bodies 472 capable of supplying thermal energy to heat the adsorbents 460 are applicable, but the heating body 472 may preferably be a resistor that generates Joule heat, and the resistor may easily supply and stop the thermal energy depending on whether or not power is applied thereto, so that individual heating of each adsorbent 460 may be facilitated. As illustrated in the drawing, the heating body 472 is a ring-shaped member having a certain area, and may be positioned to surround an outer surface of the main member 250 in which each adsorbent is positioned.

When n adsorbents 460 are provided, n heating bodies 472 having the same number as the number of adsorbents 460 may be provided. As a specific example, when it is assumed that three adsorbents 460 are provided and the first to third adsorbents 461, 463, and 465 are sequentially provided along the movement direction of the gas, the heating body 472 may be divided into a first heating body 471 formed to surround the outer surface of the main member 250 in which the first adsorbent 461 is positioned, a second heating body 473 formed to surround the outer surface of the main member 250 in which the second adsorbent 463 is positioned, and a third heating body 475 formed to surround the outer surface of the main member 250 in which the third adsorbent 465 is positioned. Unlike that illustrated in the drawing, the shape and structure of the heating body 472 capable of heating the plurality of adsorbents 460, respectively, such as a spiral hot wire, a linear hot wire, and the like is not limited and applicable.

The sub member 350 forms a sub flow path 350a branched from the main flow path 250a, and allows the gas that has passed through the adsorbent 460 to be discharged to the outside without being moved to the sensor 650. As illustrated in the drawing, the sub member 350 may be provided as a pipe member, but is not limited thereto. The sub flow path 350a of the sub member 350 may be opened and closed by a second valve 351. When the second valve 351 is opened, the gas that has passed through the concentration portion 450 may be discharged to the outside through the sub flow path of the sub member 350. Unlike this, when the second valve 351 is closed, the gas that has passed through the concentration portion 450 may move to the sensor 650.

The kit for concentrating low-concentration air pollutants including the concentration portion 450 as described above may be operated according to an adsorption mode and a desorption mode set by a control unit 750 installed to be adjacent to the main flow path 250a. In addition, the kit for concentrating low-concentration air pollutants including the concentration portion 450 may receive necessary power from a battery 850 installed to be adjacent to the main flow path 250a. The control unit 750 and the battery 850 are positioned inside the same housing in the drawing, but may be respectively positioned in separate main bodies.

Hereinafter, the operation of the kit for concentrating low-concentration air pollutants according to an embodiment of the present invention according to the mode of the control unit will be described in detail with reference to FIG. 6.

In the adsorption mode, the first valve 251 installed on the main member 250 is opened, and the external atmosphere is introduced along the main flow path 250a and passes through the concentration portion 450 in which the plurality of adsorbents 460 are arranged in a line. Furthermore, the second valve 351 installed on the sub member 350 is opened, and the gas that has passed through the concentration portion 450 moves through the sub flow path 350a and is discharged to the outside. The adsorption mode may be maintained for a certain period of time during which the contaminants may be sufficiently adsorbed to the adsorbents 460 of the concentration portion 450.

Thereafter, in the desorption mode, the second valve 351 installed on the sub member 350 is closed, and the concentrated pollutants are desorbed from the adsorbents 460 by operating the heating body 472, which is the desorption means 470, to supply thermal energy. As the second valve 351 is closed, the concentrated pollutants may move to the sensor 650 rather than the sub member 350, a pump 651 connected to the main flow path 250a may be further provided so that the pollutants may easily move to the sensor 650, and the pump 651 operates. In the desorption mode, only one pollutant may be selectively desorbed by operating one 472 of the first to third heating bodies 471, 473, and 475 depending on the type of pollutants to be sensed. Unlike this, only two heating bodies 472 of the first to third heating bodies 471, 473, and 475 may be operated, and all of the first to third heating bodies 471, 473, and 475 may be operated.

Figure 8:
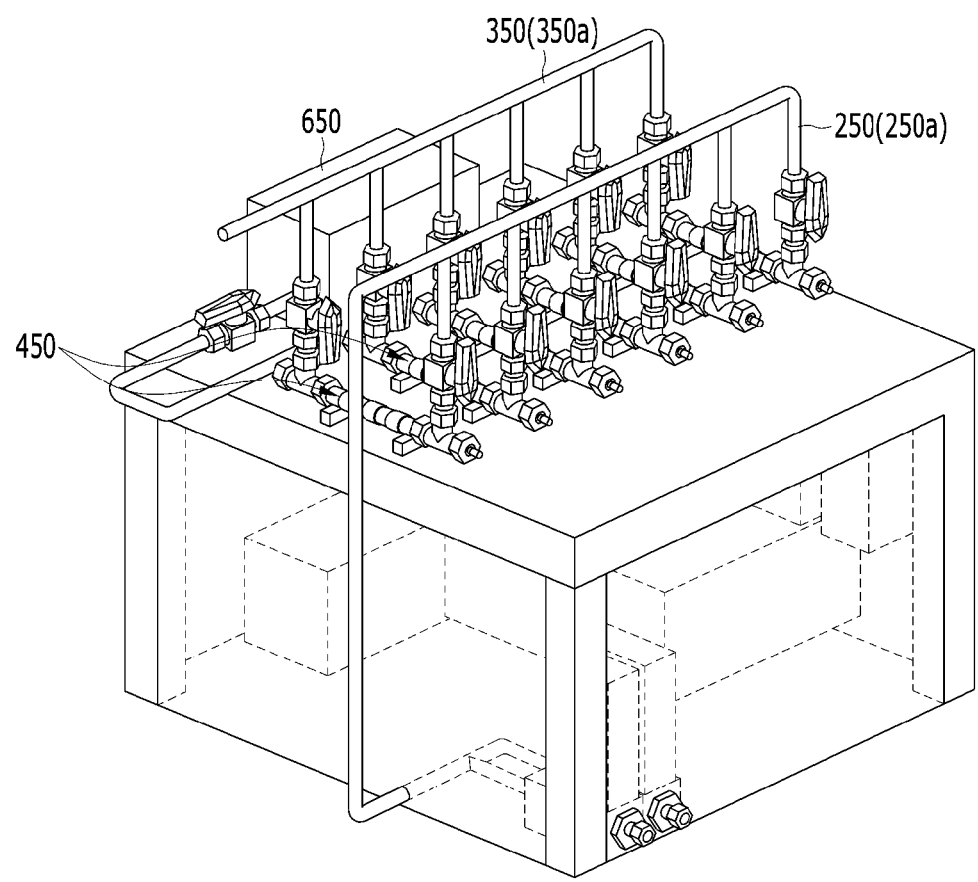
FIG. 8 is a perspective view of a kit for concentrating low-concentration air pollutants according to an embodiment of the present invention.

The kit for concentrating low-concentration air pollutants of the present invention may include a plurality of concentration portions 450 as illustrated in FIG. 8, and in this case, the concentration portions 450 may be connected in parallel to the main flow path 250a. As described above, various types of adsorbents may be installed in the kit for concentrating low-concentration air pollutants in which the plurality of concentration portions 450 are connected in parallel to the main flow path 250a, thereby selectively sensing more various types of pollutants.

The kit for concentrating low-concentration air pollutants of the present invention described above has excellent sensing sensitivity and may selectively sense a required pollutant, as the concentrated pollutants are transferred to the sensor.

Figure 9:
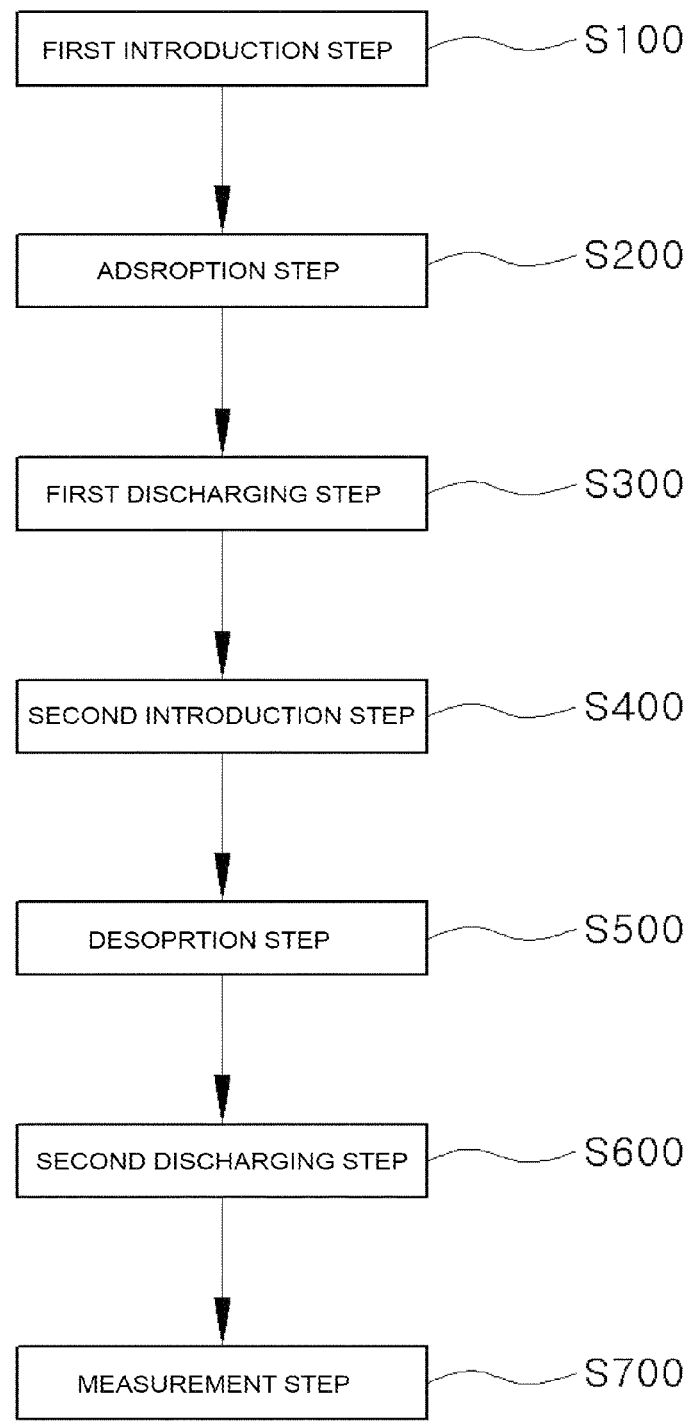
FIG. 9 is a flowchart of a method of concentrating air pollutants using the kit for concentrating low-concentration air pollutants according to an embodiment of the present invention.

FIG. 9 illustrates a flowchart of a method of concentrating air pollutants using the kit for concentrating low-concentration air pollutants according to an embodiment of the present invention. As illustrated in FIG. 9, the method of concentrating air pollutants using the kit for concentrating low-concentration air pollutants includes a first introduction step (S100) of introducing a mixed gas containing pollutants into an enclosure 100 through a first inlet 210, an adsorption step (S200) of adsorbing the pollutants contained in the mixed gas to a concentration portion 400, and a first discharging step (S300) of discharging air from which the pollutants are removed by passing through the concentration portion 400 to the outside through a first outlet 310, and the air-pollutants are adsorbed to the concentration portion 400. A process of adsorbing the pollutants as described above is referred to as a first unit process.

After the first unit process, the pollutants are desorbed from the concentration portion 400 by a second introduction step (S400) of introducing a carrier gas into the enclosure 100 through a second inlet 220 in order to desorb the pollutants adsorbed to the concentration portion 400, a desorption step (S500) of desorbing the pollutants adsorbed to the concentration portion 400 from the concentration portion 400 while the carrier gas introduced in the second introduction step (S400) passes through the concentration portion 400, and a second discharging step (S600) of discharging the pollutants desorbed from the concentration portion 400 and a concentrated gas, which is the carrier gas that has passed through the concentration portion 400, to the outside through a second outlet 320, and a measurement step (S700) in which a sensor 600 installed inside the enclosure 100 and installed in the vicinity of the second outlet 320 measures a concentration and detects a type of the pollutants contained in the concentrated gas discharged in the second discharging step (S600) is performed. A process of desorbing pollutants and measuring and detecting types of pollutants as described above is referred to as a second unit process. Through the first unit process and the second unit process, there is an effect that the amount of air pollutants contained in the external air may be easily detected even though the concentration thereof is low enough that the sensor may not detect the air-pollutants.

Figure 10:
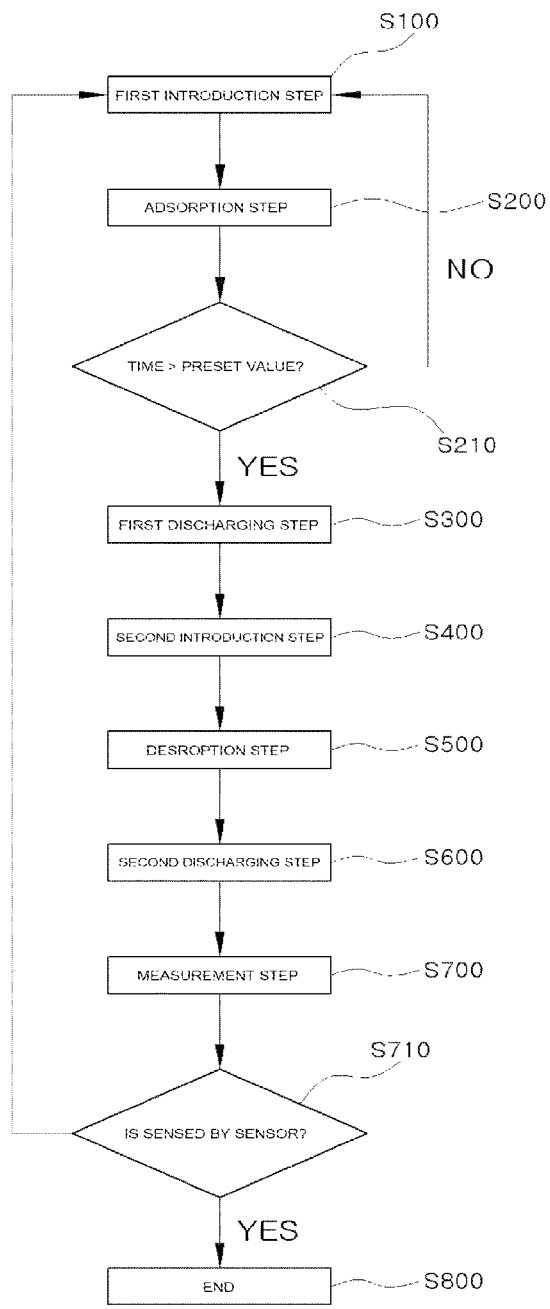
FIG. 10 is a flowchart of a method of concentrating air pollutants using the kit for concentrating low-concentration air pollutants according to a modified example of an embodiment of the present invention.

FIG. 10 illustrates a flowchart of a method of concentrating air pollutants using the kit for concentrating low-concentration air pollutants according to a modified example of an embodiment of the present invention. As illustrated in FIG. 10, in the method of concentrating air-pollutants of the present invention, a first determination step (S310) may be further performed after the first unit process.

The first determination step (S310) is a step of determining whether or not a preset time has elapsed so that the pollutants may be sufficiently adsorbed to the concentration portion 400. It is preferable that the first inlet 210 and the first outlet 310 are closed and the second unit process is performed when it is determined that the preset time has elapsed, and the first unit process is continued when it is determined that the preset time has not elapsed. In this case, the reference time may be freely changed by a user.

In addition, after the second unit process, a data transmission step (S800) of transmitting data collected by the sensor 600 in the measurement step (S700) to a server or a terminal of a user is further performed. After the data transmission step (S800), the kit for concentrating low-concentration air pollutants of the present invention performs repetitive works by performing the first unit process again.

Figure 11:
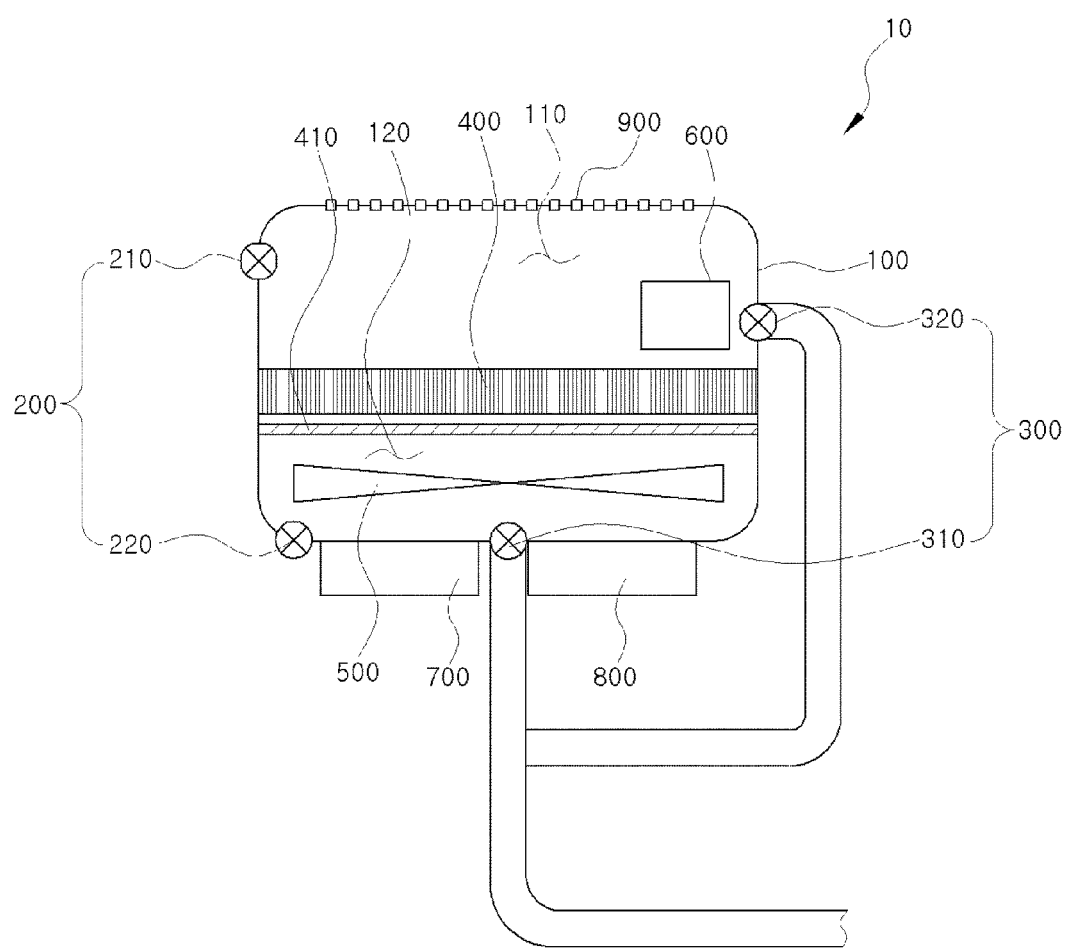
FIG. 11 is a block diagram of a kit for concentrating low-concentration air pollutants according to an embodiment of the present invention.

FIG. 11 illustrates a schematic view of a kit for concentrating low-concentration air pollutants according to another embodiment of the present invention. As illustrated in FIG. 10, a filter 410 through which the air pollutants may not pass is further installed under the concentration portion 400. The filter 410 is also preferably installed so that both ends thereof in a longitudinal direction are in contact with the inner surface of the enclosure 100, like the concentration portion 400. The filter 410 has an effect of increasing the amount of air pollutants adsorbed to the concentration portion 400 by extending the time in which the mixed air stays in the concentration portion 400 because the air pollutants may not pass therethrough.

The technical idea should not be construed as being limited to the above-described embodiment of the present invention. The present invention may be applied to various fields and may be variously modified by those skilled in the art without departing from the scope of the present invention claimed in the claims. Therefore, these improvements and changes will fall within the scope of protection of the present invention as long as it is apparent to those skilled in the art.

The invention claimed is:

1. A kit for concentrating low-concentration air pollutants, the kit comprising:
   a sensor that is positioned in a flow path through which gas moves and detects pollutants in the gas; and
   a concentration portion that includes an adsorbent that the pollutants in the gas moving to the sensor are adsorbed and desorbed and transfers concentrated pollutants to the sensor;
   an enclosure in which an internal space is formed;
   inlets formed at an upper end portion and a lower end portion of the enclosure so that the gas is introduced into the enclosure; and
   outlets formed at an upper end portion and a lower end portion of the enclosure so that the gas inside the enclosure is discharged to the outside.

2. The kit of claim 1, comprising:
   the concentration portion installed inside the enclosure to adsorb the pollutants of the gas thereto;

a fan installed under the concentration portion to adsorb or desorb the pollutants of the gas to or from the concentration portion according to a rotational direction; and the sensor installed over the concentration portion to measure a concentration of the concentrated pollutant and detect a type of the concentrated pollutant from the concentration portion, wherein the concentration portion is installed to partition the internal space of the enclosure, and an upper portion and a lower portion of the concentration portion are divided into a first zone and a second zone.

3. The kit of claim 2, wherein the inlets include:
a first inlet formed at the upper end portion of the enclosure to allow the gas to be introduced into the first zone, and
a second inlet formed at the lower end portion of the enclosure to allow a carrier gas for desorbing the pollutants adsorbed to the concentration portion to be introduced into the second zone.

4. The kit of claim 3, wherein the outlets include:
a first outlet formed at the lower end portion of the enclosure to allow the gas that passes through the concentration portion and is located in the second zone to be discharged to the outside, and
a second outlet formed at the upper end portion of the enclosure to allow the carrier gas located in the first zone and the concentrated gas including the pollutants desorbed from the concentration portion to be discharged to the outside.

5. The kit of claim 4, wherein the fan has a rotational direction for adsorbing the pollutants to the concentration portion and a rotational direction for desorbing the pollutants from the concentration portion which are opposite to each other.

6. The kit of claim 5, further comprising a control unit that controls opening and closing of the first inlet, the second inlet, the first outlet, and the second outlet, and the rotational direction of the fan.

7. The kit of claim 2, further comprising:
a solar panel installed on an outer surface of the enclosure; and
a battery that stores energy generated from the solar panel.

8. The kit of claim 2, further comprising a filter formed at a lower end of the concentration portion to prevent the pollutants from passing therethrough.

9. The kit of claim 1, wherein the concentration portion includes a plurality of adsorbents,
at least two adsorbents are formed of different materials to adsorb different pollutants, and
the concentration portion includes a desorption means positioned to be adjacent to each of the adsorbents to individually desorb the pollutants from the adsorbents.

10. The kit of claim 9, wherein the desorption means is a heating body for heating the adsorbents to desorb the pollutants from the adsorbents.

11. The kit of claim 9, wherein the concentration portion includes the adsorbents arranged to be spaced apart from each other at equal intervals along a movement direction of the gas.

12. The kit of claim 9, comprising:
a main member forming a main flow path through which the gas introduced from the outside moves to the sensor;
the concentration portion positioned on the main flow path; and a sub member positioned between the concentration portion and the sensor and forming a sub flow path branched from the main flow path.

13. The kit of claim 12, wherein a plurality of concentration portions is provided, and
the concentration portions are connected in parallel to the main flow path.

14. A concentrating method using a kit for concentrating low-concentration air pollutants, the concentrating method comprising:
a first unit process including:
a first introduction step of introducing a gas containing pollutants into an upper end portion of an enclosure through an inlet formed at the upper end portion of the enclosure by rotating a fan installed at a lower end portion of the enclosure;
an adsorption step of adsorbing the pollutants contained in the gas introduced in the first introduction step to a concentration portion; and
a first discharging step of discharging the gas passing through the concentration portion through an outlet formed at a lower end portion of the enclosure, and
a second unit process including:
a second introduction step of introducing a carrier gas into the enclosure through an inlet formed at the lower end portion of the enclosure by rotating the fan in a direction opposite to that in the first introduction step;
a desorption step of desorbing the pollutants adsorbed to the concentration portion by the carrier gas introduced in the second introduction step;
a second discharging step of discharging a concentrated gas including the pollutants and the carrier gas through an outlet formed at the upper end portion of the enclosure; and
a measuring step of measuring, by a sensor, the type and concentration of pollutants contained in the concentrated gas discharged in the second discharging step,
wherein the second unit process is performed after the first unit process is performed for a predetermined time.

15. The concentrating method of claim 14, further comprising a first determination step of determining whether or not the time for performing the first unit process is a preset value or more,
wherein when it is determined in the first determination step that a time value for which the first unit process is performed is the preset value or more, the inlet formed at the upper portion of the enclosure and the outlet formed at the lower portion of the enclosure are closed and the second unit process is performed, and
when it is determined in the first determination step that the time value for which the first unit process is performed is less than the preset value, the first unit process is further performed.

16. A method of detecting low-concentration air pollutants, the method comprising:
continuously performing a first unit process for a predetermined time, the first unit process including:
a first introduction step of introducing a gas containing pollutants into an upper end portion of an enclosure through an inlet formed at the upper end portion of the enclosure by rotating a fan installed at a lower end portion of the enclosure;
an adsorption step of adsorbing the pollutants contained in the gas introduced in the first introduction step to a concentration portion; and a first discharging step of discharging the gas passing through the concentration portion through an outlet formed at a lower end portion of the enclosure, and performing a second unit process including:

a second introduction step of introducing a carrier gas into the enclosure through an inlet formed at the lower end portion of the enclosure by rotating the fan in a direction opposite to that in the first introduction step;

a desorption step of desorbing the pollutants adsorbed to the concentration portion by the carrier gas introduced in the second introduction step;

a second discharging step of discharging a concentrated gas including the pollutants and the carrier gas through an outlet formed at the upper end portion of the enclosure; and a measuring step of measuring, by a sensor, the type and concentration of pollutants contained in the concentrated gas discharged in the second discharging step.

17. The method of claim 16, further comprising, after the performing of the second unit process, a data transmission step of transmitting data measured by the sensor to a server or a terminal of a user.

18. The method of claim 17, wherein after the data transmission step, the first unit process is performed again.

* * * * *